United States Patent [19]

Chase

[11] Patent Number: 4,538,952

[45] Date of Patent: Sep. 3, 1985

[54] MOBILE BOAT DOLLY

[76] Inventor: Cleve D. Chase, 2024 Highway 20, Sedro Woolley, Wash. 98284

[21] Appl. No.: 513,779

[22] Filed: Jul. 15, 1983

[51] Int. Cl.³ ............................................. B60P 3/10
[52] U.S. Cl. .................................. 414/458; 280/414.1
[58] Field of Search ............... 280/414.1, 414.2, 414.3; 414/458, 459, 460, 461

[56] References Cited

U.S. PATENT DOCUMENTS

| | | | |
|---|---|---|---|
| 3,521,773 | 7/1970 | Geister | 414/458 |
| 4,072,293 | 2/1978 | Sadler | 414/461 |
| 4,232,879 | 11/1980 | Boxrud | 280/414.1 |
| 4,822,899 | 7/1974 | Slack | 414/477 X |

*Primary Examiner*—John A. Pekar
*Attorney, Agent, or Firm*—Hughes, Barnard & Cassidy

[57] ABSTRACT

A mobile straddle-type boat dolly (10) for use in rapid on-loading, overland transport, and off-loading of commercial fishing boats and the like, and having spaced, parallel port and starboard frame members (15P, 15S) supported on multiple axle, dual wheel running gear (16P, 16S) and including port and starboard, fore and aft, fluid actuated, vertically reciprocable lift pad assemblies (25P, 25S, 26P, 26S) and flexible tensioning means extending between each of the forward lift pad assemblies (25P, 25S) and each of the aft lift pad assemblies (26P, 26S); and; wherein the flexible tensioning means comprises fore and aft flexible straps (31, 32) formed of nylon webbing or the like extending from take-up/pay-out reels (34) mounted on one of the frame members (15P) over the pivot rollers (35) and idler rollers (38) associated with the port lift pad assemblies (25P, 26P) and over the pivot rollers (35) and idler rollers (38) associated with the starboard lift pad assemblies (25S, 26S) and releasably interconnected by interconnection means (36, 37) to the starboard frame member (15S) with the fore and aft flexible straps (31, 32) spanning the space between the port and starboard frame members (15P, 15S) and underlying the keel (42) and hull (44) of a boat carried by the dolly (10) in snug conformity thereto; and, wherein the flexible straps (31, 32) are provided with depending weights (41) to insure submersion thereof when the dolly (10) is backed into the water for on-loading of a floating boat. The portable dolly (10) includes a self-contained fluid actuating system (20) for actuating the piston/cylinder combinations (29) associated with the port and starboard fore and aft lift pad assemblies (25P, 25S, 26P, 26S) and adjustable outrigger members (45, 46) selectively mountable on the port or starboard side of the dolly (10) and laterally adjustable with respect to the longitudinal fore/aft centerline thereof for assisting in on-loading of boats irrespective of current, tidal and/or wind conditions.

18 Claims, 9 Drawing Figures

MOBILE BOAT DOLLY

BACKGROUND OF THE INVENTION

1. Technical Field

The present invention relates generally to boat dollies; and, more particularly, to an improved boat dolly characterized by its mobility, stability, ruggedness, and durability and which is especially suited for: (i) rapid on-loading of commercial fishing boats and the like from either an off-shore floating or a beached position reasonably proximate to a boat storage marina or yard; (ii) over-land transport from the point of on-loading to the marina storage facility; and (iii), rapid off-loading of the boat and placement on suitable storage blocks or the like—and, wherein each boat dolly is capable of handling a relatively high number of boats per day and transporting the same between either an off-shore floating or a beached position and a permanent or semi-permanent storage site during the off season. For example, commercial fishing boats of the type commonly used in such fisheries as the Alaskan fishery are generally relatively large vessels ranging in weight from about 10,000 pounds to on the order of about 30,000 pounds or more. At the conclusion of each fishing season, the owners of such boats will normally have the vessels hauled to a suitable boat yard or marina for dry storage, maintenance and repair, with such boats again being launched shortly prior to the next fishing season. There are, of course, a limited number of suitable accessible storage yards and/or marinas capable of handling vessels of this type; while, at the same time, when a given fishing season ends, the captains, crews and owners of each boat in the fishing fleet are interested in having their boats hauled out of the water and transported to a suitable point of dry storage as rapidly as possible in order that the crew can return home. As a consequence, at the conclusion of any given fishing season, the owners and/or managers of boat storage facilities find themselves suddenly inundated by a large number of boats, all of whose crews demand immediate service so as to expedite their return home. When using mobile boat dollies incorporating the features of the present invention, such marina and/or boat yard personnel find that they can readily handle the demands for immediate service from a large number of boat captains, crews and/or owners since any given boat dolly is fully capable of handling several dozen boats per day irrespective of differences in boat sizes and designs and irrespective of tidal and/or wind conditions assuming only that the ultimate dry storage site is located in reasonable proximity to the launch ramp or other location where the boat is to be hauled and loaded on the trailer.

2. Background Art

Many different types of mobile boat dollies have been designed and used over the years for handling all types and sizes of boats ranging from relatively small private pleasure boats up to relatively large commercial fishing boats. Generally, the handling of pleasure craft does not present a significant problem for boat storage facilities since many boat owners own their own mobile boat trailers and provide their own storage facilities; while those who do require services and support by storage marinas and/or boat yards are generally able to fit within a work schedule wherein delays measured in hours, days or even longer are not critical and will not result in loss of business for the marina or boat yard. In the commercial fishing business, on the other hand, the boats are generally used until virtually the last minute prior to conclusion of the fishing season; and, when the season ends, it is imperative that the marina and/or boat yard be able to accommodate the needs of the boat owners and/or crews, all of whom are interested in having their boat hauled and stored as rapidly as possible in order that the crew can return home after prolonged absences of many weeks and/or months. In those instances where a marina finds itself unable to accommodate a large number of boats on a given tide, the crews of those boats who cannot be immediately accommodated will often seek alternative storage facilities even though such alternative facilities may be less convenient rather than having to wait until the next tide or day. To minimize this problem, some of the larger marinas and/or boat yards have tended to acquire and maintain extra dollies and boat handling personnel so as to be able to meet peak demands; but, of course, this "solution" requires significant capital investment in boat handling equipment and in manpower—steps that are not economically justified during non-peak periods.

A wide variety of different mobile boat trailers have been designed and tried over the years. Typical of the designs are those shown in, for example, U.S. Pat. Nos. 3,822,899—Slack and 4,232,879—Boxrud. Thus, in each of these patents, there is disclosed a tandem axle boat trailer having a generally rectangular or box-like rigid frame with fixed support means in the form of fore and aft port and starboard boat support pads of the like. In each case, the boat trailer is designed to be backed into the water and at least partially submerged, with the boat to be hauled then maneuvering over the trailer and boat supports so that when the trailer is pulled out of the water, the boat is supported thereon and capable of being transported to a suitable storage site. In the Slack patent, the patentee provides an adjustable bow support bracket and port and starboard locating markers which can be used to facilitate positioning of the boat over the submerged or partially submerged trailer. The Slack trailer is further provided with a plurality of fixed, rigid, transverse support beams or tie bars which are common to most boat trailers; but, which tend to make it difficult and time consuming to off-load the boat from the trailer onto suitable storage blocks or the like at the storage facility. Indeed, such fixed structural elements generally require special boat handling equipment capable of lifting the boat off the trailer and either shifting it laterally or supporting it in a suspended state while the trailer is moved out from under the boat.

In the Boxrud patent, the patentee attempts to minimize this problem by providing rigid but removable crossbeams which are associated with a generally U-shaped or V-shaped frame having a pair of spaced port and starboard frame members capable of being shifted towards and away from one another to accommodate boats having different hull configurations and/or beam widths. The Boxrud frame may be vertically adjusted relative to the wheel support by means of an hydraulic actuation system, although the support pads carried by the frame are not vertically adjustable with respect thereto.

A "straddle-type" small boat trailer said to be suitable for boat yard use is also disclosed in U.S. Pat. No. 3,663,040—Weaver et al. As in the Boxrud patent, the Weaver et al trailer or dolly comprises a generally U-shaped frame which requires the use of disconnectible tension means or tie bars to minimize "spreading" of the port and starboard frame members due to the weight of the boat being transported.

Other representative patents of general interest include: U.S. Pat. Nos. 3,356,239—Klein; 3,539,065—Brownell; 3,554,394—Hedman; and, 3,572,743—Parr; all of which relate to mobile boat trailers; as well as U.S. Pat. Nos. 2,547,269—Kinsey and 3,255,906—Proler et al which respectively relate to a semitrailer for transporting houses and to a system for transporting containerized materials or the like.

Although not specifically disclosed in the foregoing patents, other "straddle-type" commercial fish boat mobile dollies have been known and used in the past which employ four or more hydraulically actuated lift pads—viz., at least a fore and aft lift pad on each of the port and starboard frame members—which have been commonly controlled by an external hydraulic system often associated with the towing vehicle. Again, however, such "straddle-type" mobile dollies have been faced with serious "spreading" problems which have generally necessitated the use of removable transverse tie beams or the like. And, of course, where vertically adjustable lift pads have been provided, the "spreading" phenomenon attributable to the weight of the boat—a truly significant problem with commercial fishing boats commonly weighing up to 30,000 pounds or more—has not only been experienced with respect to the port and starboard frame members or beams of the dolly but, in addition, since the weight of the vessel is carried directly by the port and starboard lift pads, there has been a tendency for such pads to bend or spread outwardly, particularly when hydraulically extended towards or to an upper limit position, thus damaging the lift pads and preventing vertical movement thereof.

SUMMARY OF THE INVENTION

A mobile straddle-type boat dolly suitable for use in boat yards and/or boat storage marinas is disclosed which is particularly suited for use in handling of relatively large commercial type fishing boats and the like ranging in weight up to on the order of 30,000 pounds, yet which is characterized by: (i) its flexibility in accommodating different boat shapes and/or sizes; (ii) its ruggedness and stability; (iii) the absence of rigid, transversely extending, removable tie bars or the like; and (iv), vertically adjustable, hydraulically actuated port and starboard lift pads including means associated therewith for preventing spreading of the pads, even when extended, and for also preventing spreading of the port and starboard frame members of the straddle-type dolly without interfering with rapid on- and/or off-loading of boats with respect to the dolly. Mobile boat dollies incorporating features of the present invention are further characterized by the provision of adjustable outriggers to facilitate on-loading of boats over submerged dollies irrespective of tidal currents, crosscurrents, winds, and similar hazards. Such boat dollies are also characterized by their ability to permit on-loading of boats from either an off-shore floating position or from a beached position, and are capable of depositing a boat transported from the water directly onto storage blocks at a permanent or semi-permanent storage location and immediately driving out from under the thus deposited stored boat. The dolly and all actuating mechanisms are totally self-contained, requiring only a towing vehicle or mechanism, and are capable of both on-loading and off-loading a boat of virtually any size within a matter of a few minutes; and, consequently, the most significant limiting factor in the number of boats that can be handled per hour (or other time unit) by any given dolly is the distance between the beach or other on-loading area and the permanent or semi-permanent storage location at the boat yard or marina.

More specifically, it is a general aim of the present invention to provide an improved straddle type mobile boat dolly characterized by its simplicity and ruggedness, yet which is capable of on-loading and off-loading a wide variety of different types of boats such as commercial fishing boats ranging in size up to 30,000 pounds, or more, rapidly and in a matter of only a few minutes per boat loading or off-loading operation, thereby enabling each dolly to handle a large number of boats in a relatively short time period.

It is a more detailed objective of the invention to provide a mobile boat dolly characterized by its versatility in terms of the types and sizes of boats that can be accommodated, the conditions under which boats can be loaded—i.e., from: either a floating position or from a beached position—and, the ease and simplicity of boat off-loading operations; yet, wherein the straddle-type dolly and its operating mechanisms are not subjected to "spreading" due to the weight of the load being carried and inherent on uneven terrain conditions over which the boat is transported.

Yet another objective of the invention is the provision of an improved tension control system for preventing spreading of U-shaped straddle-type boat dollies which is highly effective in use and which serves to enhance the stability of hydraulically actuated boat lift pads, yet which does not interfere with boat loading or off-loading operations.

In another of its more detailed aspects, it is an object of the present invention to provide an improved mobile boat dolly of the foregoing type having an adjustable outrigger system suitable for facilitating loading of boats from an off-shore floating position irrespective of wind, current and/or tidal conditions and which can be readily adjusted to accommodate boats having a wide range of beam widths and/or hull configurations.

DESCRIPTION OF THE DRAWINGS

These and other objects and advantages of the present invention will become more readily apparent upon reading the following detailed description and upon reference to the attached drawings, in which.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as expressed in the appended claims.

DETAILED DESCRIPTION

Turning now to the drawings, there has been illustrated in FIGS. 1–4, a straddle-type mobile boat dolly, generally indicated at 10, embodying features of the present invention. As here shown, the dolly 10 includes a rigid V-shaped forward frame portion, generally indicated at 11, comprising port and starboard inboard and outboard heavy gauge tubular steel beams 12P, 12S and 14P, 14S, as most clearly shown in FIG. 2; and, terminating in rearwardly extending, spaced, parallel port and starboard main frames 15P, 15S also formed of heavy gauge tubular metal beam-like material. In the illustrative form of the invention here shown, the port and starboard main frame members 15P, 15S are supported for transport on port and starboard running gear, generally indicated at 16P, 16S, which preferably comprises at least tandem axle, dual wheel supports associated with each main frame member 15P, 15S and, preferably, triple axle, dual wheel supports as here shown. The forward V-shaped end portion 11 of the dolly 10 includes a transverse deck 18, a vertical support 19 for carrying a self-contained hydraulic actuating system 20, a bow support 21, hitch means generally indicated at 22 for attachment to a suitable tow vehicle (not shown), and a manually actuated support jack 24.

Figure 1:
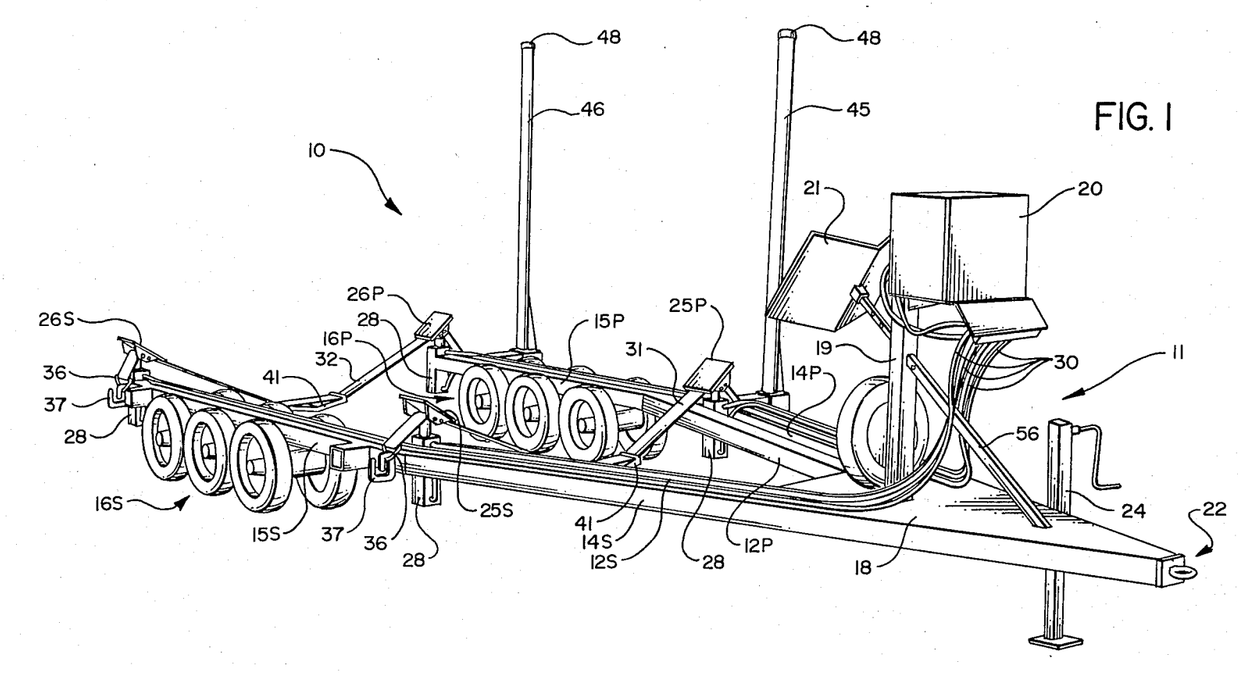
FIG. 1 is a perspective view of a mobile boat dolly embodying features of the present invention.
Figure 2:
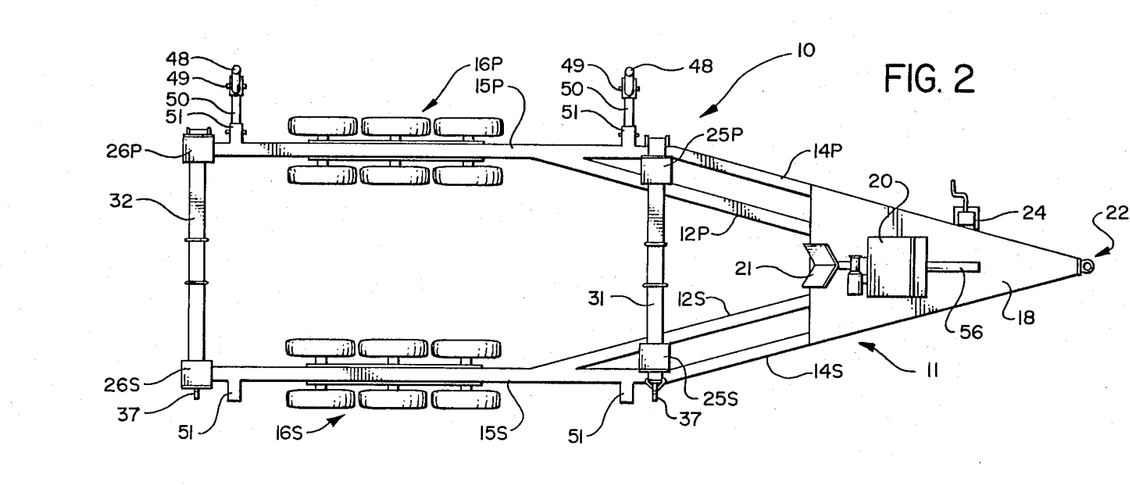
FIG. 2 is a highly simplified, diagrammatic, plan view of the boat dolly shown in FIG. 1, but here depicting the dolly with parts removed for purposes of clarity.
Figure 3:
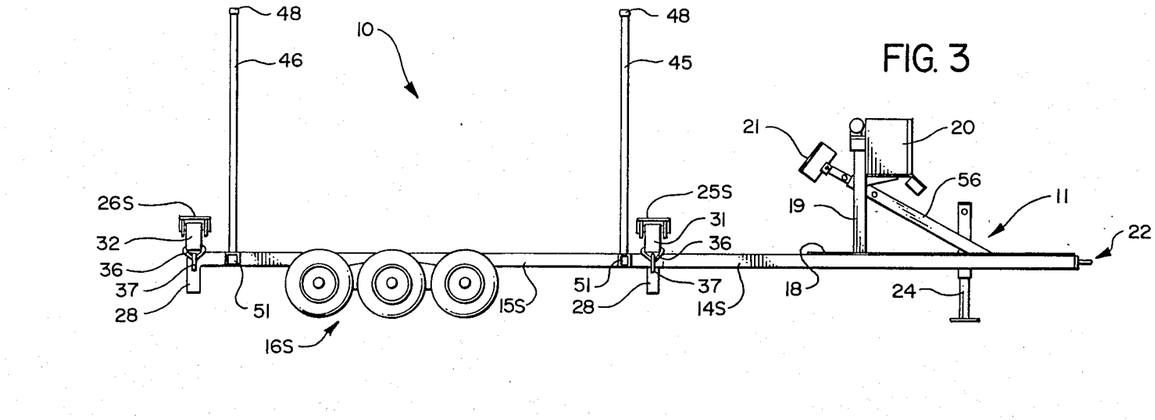
FIG. 3 is a highly simplified, diagrammatic, side elevational view of the boat dolly shown in FIG. 1, again with parts removed for purposes of clarity.
Figure 4:
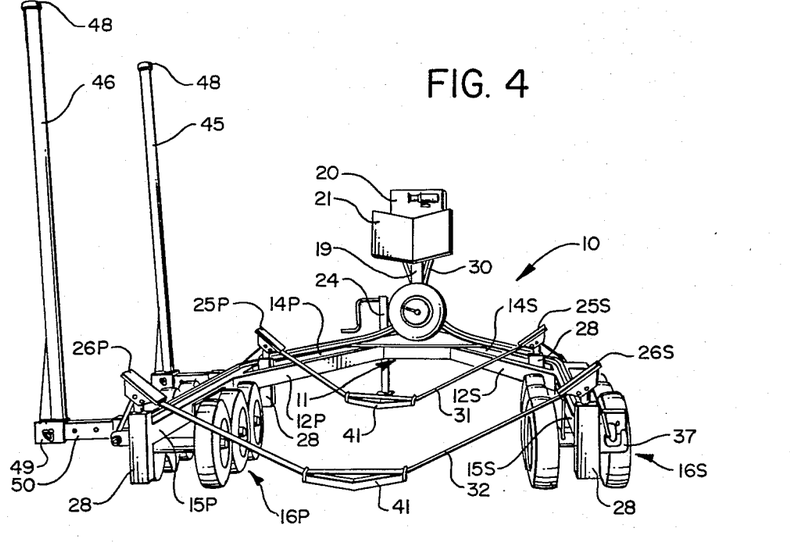
FIG. 4 is a rear perspective view of the boat dolly shown in FIG. 1.
Figure 5:
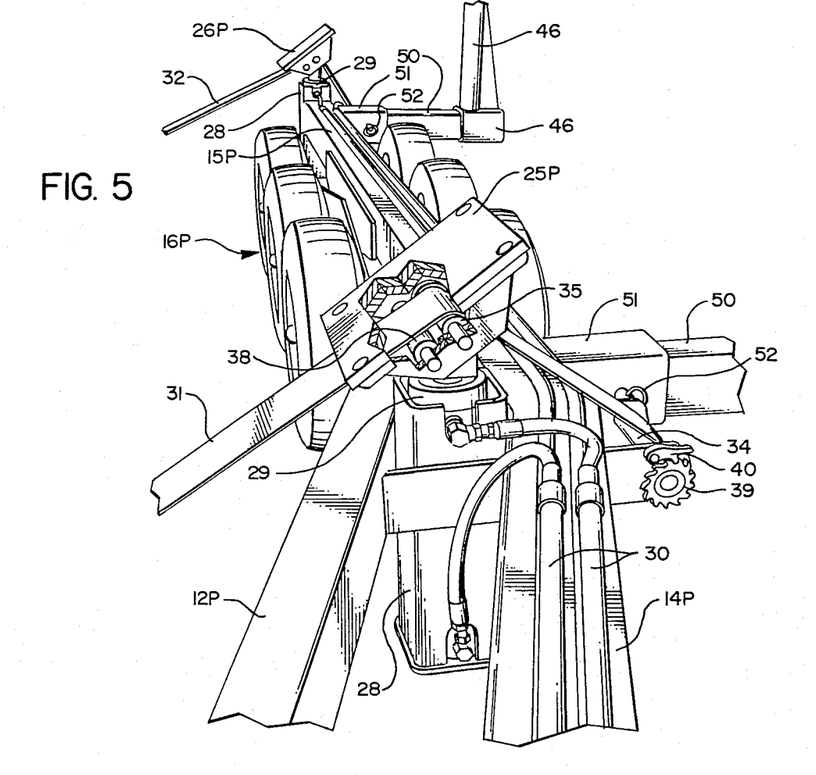
FIG. 5 is an enlarged, fragmentary, perspective, cut-away view looking aft along the port side of the boat dolly of the present invention and here illustrating details of one of the boat lift pads and the mechanism for adjusting the transversely extending flexible strap associated therewith.

In order to provide fore and aft support of a boat (not shown in FIGS. 1–4) on the dolly 10, the dolly is provided with vertically adjustable, port and starboard, forward lift pads 25P, 25S and aft lift pads 26P, 26S, each of which includes: (i) a rigid vertically upright tubular guide member 28 fixedly secured to the main frame member or beam 12P, 12S, 14P, 14S and/or 15P, 15S as by welding or the like; (ii) a piston/cylinder combination 29 mounted therein as best shown in FIG. 5; (iii) a cushioned lift pad 25P, 25S, 26P, 26S pivotally connected to the piston of the associated piston/cylinder combination 29; and (iv), suitable hydraulic conduits 30 for interconnecting the opposite ends of the piston/cylinder combination 29 to the self-contained hydraulic actuating system 20. The arrangement is such that the port and starboard fore and aft lift pads 25P, 25S and 26P, 26S may be extended and/or retracted vertically with respect to the beam-like frame members 12P, 12S, 14P, 14S and/or 15P, 15S, either individually or in unison and through similar or dissimilar distances by suitable manual operating controls (not shown) associated with the hydraulic actuating system 20 (FIG. 1) so as to raise and/or lower boats supported thereby relative to the main frame of the dolly 10, thereby enabling the equipment to readily conform to different hull shapes and configurations and to the same or differing lift requirements resulting from the relative positions of the dolly and the boat to be loaded and/or off-loaded.

As the ensuing description proceeds, those skilled in the art will appreciate that the particular dimensions of the foregoing structural elements are not critical to the present invention and may vary widely dependent upon the type of boat to be handled. However, it has been found that when dealing with the types of commercial fishing vessels commonly encountered in the Alaskan fishery, it is generally desired to space the dolly's frame members such that the space between the aft port and starboard lift pads 26P, 26S is on the order of about 8′ or about 9′; while the space between the front port and starboard lift pads 25P, 25S is somewhat less—say, for example, on the order of from about $5\frac{1}{2}'$ to about $7\frac{1}{2}'$. As more clearly shown by reference to FIGS. 2 and 5, this may be readily accomplished by mounting the vertical tubular guides 28 for the rear lift pads 26P, 26S at the aft ends of the main frame members 15P, 15S, while the vertical tubular guides 28 for the forward lift pads 25P, 25S are mounted inboard thereof—for example, intermediate the V-shaped inner and outer beam members 12P, 14P and 12S, 14S.

Figure 6:
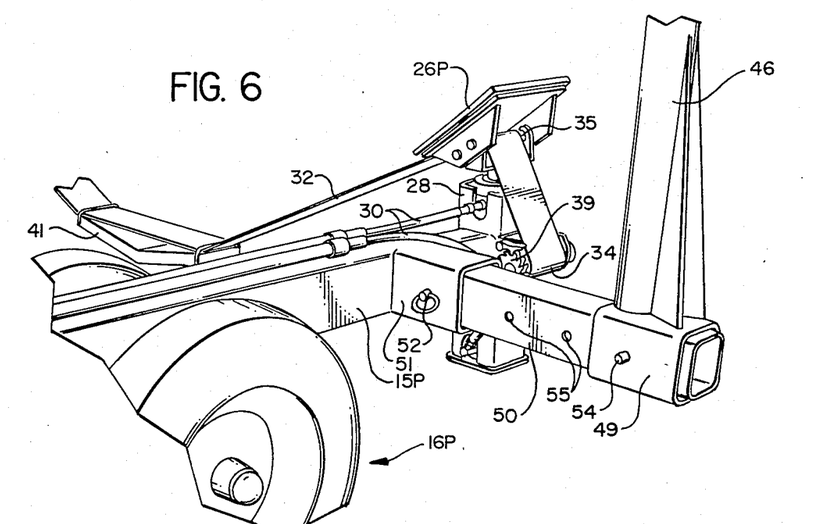
FIG. 6 is a fragmentary perspective view of the port rear quarter of the boat dolly depicted in FIG. 1, here illustrating details for one of the adjustable outriggers and of the rearmost one of the transverse flexible straps and associated lift pad.
Figure 7:
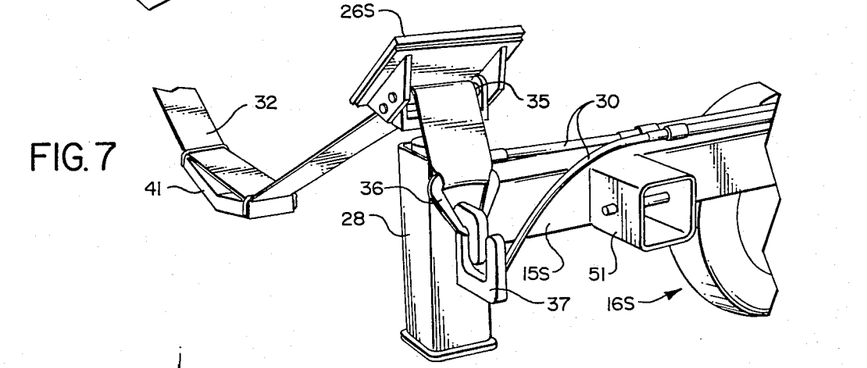
FIG. 7 is a fragmentary perspective view of the starboard rearmost portion of the boat dolly of the present invention illustrating particularly details of the transverse strap securement assembly.

In accordance with one of the important aspects of the present invention, provision is made for stabilizing the dolly frame members and lift pads and for preventing spreading or bending thereof when the dolly is being used to transport a relatively heavy boat; yet, at the same time, eliminating the need for rigid demountable tie beams which tend to interfere with loading and/or unloading of boats on and/or off of the dolly 10. To accomplish this, and as best illustrated by reference to FIGS. 1 and 4 through 7 conjointly, a tensioning system comprising fore and aft flexible straps 31, 32 preferably formed of nylon webbing or the like (which may or may not be reinforced nylon webbing) are provided with each strap extending from a manually adjustable take-up/pay-out reel 34 (best shown in FIGS. 5 and 6) over a roller 35 associated with and about which the port lift pads 25P, 26P are pivotally connected to the upper end of the piston in the piston/cylinder combination 29, with the flexible straps 31, 32 extending across the otherwise uninterrupted span between the port and starboard frame members 12P, 14P, 15P and 12S, 14S, 15S, and passing over similar rollers 35 (See, e.g., FIG. 7) associated with the starboard lift pads 25S, 26S. The free ends of the flexible straps 31, 32 are provided with integral attachment rings 36 adapted to be releasably hooked about a laterally projecting hook 37 welded or otherwise permanently and fixedly secured to the tubular guide members 28 associated with the starboard lift pads 25S, 26S. While those skilled in the art will appreciate that the particular material from which the straps 31, 32 are formed and the dimensions thereof may vary widely without departing from the spirit and scope of the invention, excellent results have been achieved using a nylon strap material on the order of 6″ in width and generally similar to that used in the trucking industry to tie down stacked loads on semitrailers where the straps employed are commonly about 4" in width.

In carrying out the invention, provision is made for insuring that the lift pads 25P, 25S, 26P, 26S maintain a proper inclination at all times relative to their pivotal mounting through roller 35 to the upper end of the piston in the piston/cylinder combination 29, thereby insuring that the lift pads are presented at a proper inclination to the exterior surface of the boat's hull and preventing damage thereto. To accomplish this, and as best shown in FIG. 5, each lift pad assembly includes a second roller 38 located inboard of roller 35 and generally parallel thereto. The transverse flexible strap 31 (strap 32 in the case of the aft port and starboard lift pads 26P, 26S) is wrapped over both the pivot roller 35 and the inboard roller 38, thereby maintaining the lift pad in the general position shown in FIG. 5, while permitting pivoting thereof about the axis of the pivot roller 35 so as to enable the lift pads 25P, 25S, 26P, 26S to conform to the outer hull surface in substantially face-to-face relation therewith.

To permit adjustment of the straps 31, 32, the take-up/pay-out reels 34 (FIGS. 5 and 6) are preferably provided with conventional locking ratchet and pawl mechanisms, generally indicated at 39, 40. Thus, the arrangement is such that the ratchets 39 may be manually rotated by any suitable means (not shown) so as to shorten or tighten the straps 31, 32 with the pawls 40 serving to prevent loosening thereof; or, alternatively, the pawls 40 may be manually disengaged from the ratchets 39 so as to permit pay-out of the strap and consequent loosening thereof.

In order to insure that the straps 31, 32 submerge when the dolly 10 is backed into the water during loading of a boat off-shore, each strap is preferably threaded through channel defining elements formed on the opposite free ends of a V-shaped weight 41 preferably centered on the strap with respect to the port and starboard main frame members 15P, 15S and adapted to be spaced from, and suspended below, the keel of a boat—e.g., the keel 42 of the boat 44 shown fragmentarily in FIG. 8.

In accordance with another aspect of the invention, the illustrative boat dolly 10 is provided with rigid adjustable outrigger members shiftable between the port and starboard sides of the dolly 10 and adjustable relative to the longitudinal centerline thereof for assisting in proper positioning and loading of the boat on a submerged or partially submerged dolly 10 under adverse tidal, current and/or wind conditions. Thus, as shown in FIGS. 1 through 6, vertical upright tubular pipe-like fore and aft outrigger elements 45, 46 are provided, each having a hull engaging rotatable protective wheel 48 at its upper end and each including an open-ended tubular bracket 49 (best shown in FIG. 6) at its lower end adapted to fit snuggly but slidably about a laterally extending support beam 50 received within and removably secured to a laterally projecting beam-like stub tube 51 integral with the main port frame 15P by means of a removable locking pin 52. The open-ended tubular bracket 49 may be adjusted inboard or outboard along tubular extension 50 dependent upon the beam width of the boat and releasably secured in placed by means of a second removable locking pin 54 adapted to extend though the bracket 49 and one of a series of spaced openings 55 extending in a fore/aft direction through the extension beam 50 at various distances from the centerline of the dolly 10. As will be appreciated upon comparison of FIGS. 6 and 7, similar outrigger stub support tubes 51 are also mounted on and extend laterally from the starboard main frame member 15S, thereby readily permitting shifting of the outriggers 45, 46 and the extension beams 50 between the port side of the dolly as shown and the starboard side of the dolly so as to facilitate loading of a boat irrespective of whether prevailing wind and/or currents are tending to move the boat towards the port or towards the starboard side of the dolly during a loading operation. That is to say, the outriggers 45, 46 serve a dual function—viz., (i) they provide a visual indication of the position of the submerged dolly 10; and (ii), they provide an above water physical barrier or obstruction in the nature of a piling which serves to guide the boat relative to the submerged dolly during an on-loading operation.

In operation, and assuming that the dolly 10 of the present invention is being used to transport a boat from an off-shore floating position, the dolly operator positions the outriggers 45, 46 on either the port or starboard side of the dolly 10 and spaced from the centerline thereof by a distance corresponding to approximately one-half of the beam width of the boat to be loaded. The dolly is then backed into the water to a submerged or partially submerged condition; and, because the flexible straps 31, 32 are weighted by weights 41, they are submerged below the keel depth of the boat. Thus, assuming that prevailing current and/or wind conditions are tending to move the boat towards the port side of the dolly, the dolly operator locates the outriggers 45, 46 on the port side of the dolly 10 as shown in the drawings. Thereafter, the skipper of the boat maneuvers the boat in an upstream direction towards the trailer at an angle of approximately 90° with respect thereto and places the bow of the boat in contact with the roller 48 on the port aft outrigger 46. Thus, the prevailing tide and/or current conditions tend to hold the bow against the outrigger as the skipper then turns the boat and moves in-shore over the dolly along the aft outrigger 46 while using the outrigger as a stationary guide, placing the bow of the boat in contact with the bow stop 21. Although not shown in detail in the drawings, those skilled in the art will appreciate that the bow stop 21 is pivotally mounted on the aft end of a longitudinally adjustable bow support 56 passing through upright support 19. As a consequence, the bow support 21 may be readily adjusted dependent upon the length of the boat to be transported and readily conforms to the contour of the bow. The boat is now tied to the bow stop in any suitable manner and the dolly operator begins to actuate the hydraulic lift pads 25P, 25S, 26P, 26S so as to extend the pads vertically into engagement with the hull of the boat. When all four lift pads are engaged with the boat hull, the dolly is pulled out of the water in readiness to transport the boat to a permanent or semi-permanent storage site. At this point, the flexible straps 32 are checked to insure that they are properly tightened and extend snuggly about the keel of the vessel. It will be appreciated that during transport of the vessel, the tight straps 31, 32 serve to provide an effective tensioning device which prevents spreading of the main frame members 15P, 15S due to the weight of the boat as it travels over irregular terrain. At the same time, since the straps extend over rollers 35, 38 and about the upper ends of the piston/cylinder combinations 29, they provide a stabilizing and strengthening affect which prevents the extended lift pads and their associated piston/cylinder combinations from bending outwardly due to the load carried thereby.

When the dolly operator gets to the storage site, it is merely necessary to back the dolly over storage blocks. At this point, the hydraulically actuated lift pads 25P, 25S, 26P, 26S are lowered to deposit the boat on the storage blocks; and, as the lift pads move downwardly, the transverse flexible straps 31, 32 tend to loosen. Consequently, when the boat is solidly supported on the support blocks, the dolly operator merely unhooks the attachment rings 36 from the hooks 37, pulls the straps 31, 32 out from beneath the boat, and moves the dolly 10 outwardly from beneath the boat. The straps are then rehooked and the dolly returns to load the next boat awaiting hauling and storage.

Figure 8:
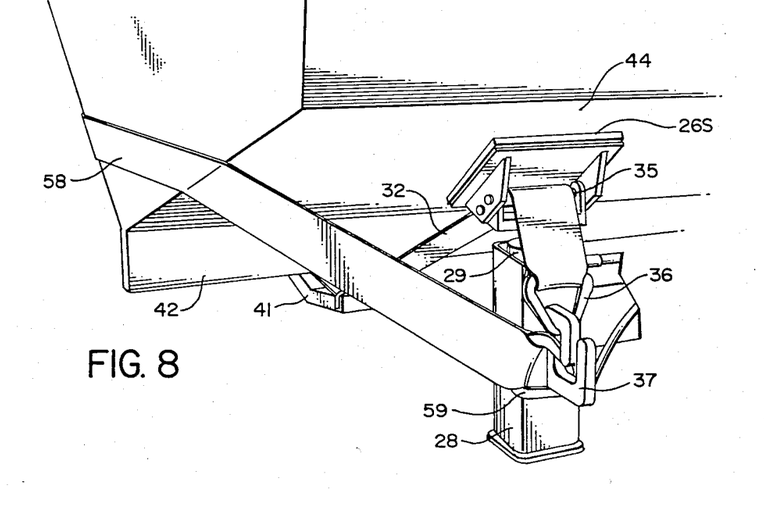
FIG. 8 is a fragmentary perspective view similar to that shown in FIG. 7, but here illustrating a slightly modified form of the invention employing a third flexible strap adapted to extend about the rear of a boat supported on the dolly for assisting in maintenance of the boat in a stable position during transport; and, FIG. 9 is a highly simplified and diagrammatic side elevational view similar to that depicted in FIG. 2, but here diagrammatically depicting the dolly supporting the hull of a boat to be transported thereon.
Figure 9:
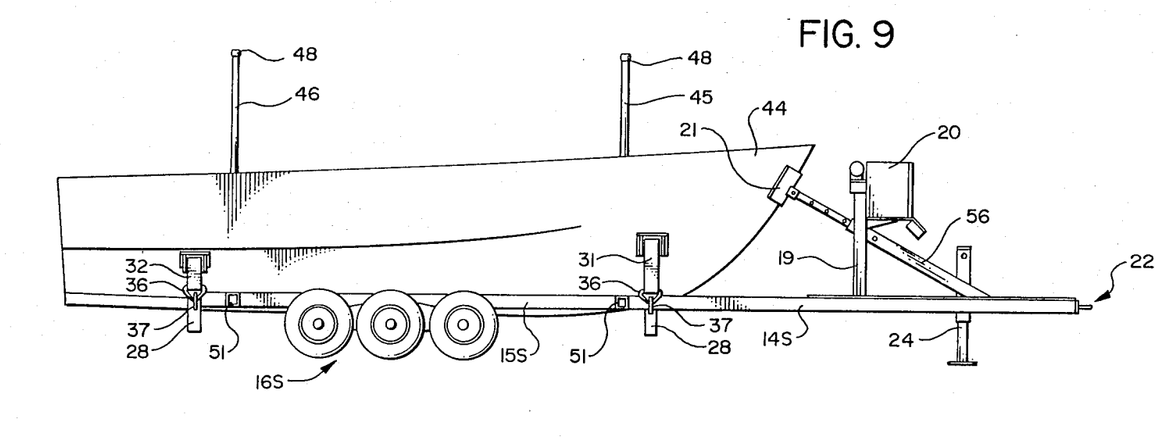

Referring now to FIG. 8, a slightly modified boat support system has been illustrated. Thus, as here shown, the boat support assembly is generally identical to that described above except that in this instance a third flexible strap 58 mounted on a suitable take-up reel (not shown) on the port side rear guide member 28 (not visible in FIG. 8) extends around the stern of the boat and is secured to the starboard side attachment hook 37 by means of an attachment ring 59. Thus, the arrangement is such that strap 58 serves to stabilize the boat 44 on the dolly and to prevent rearward slippage of the boat during transport.

Those skilled in the art will appreciate that there has hereinabove been described a simple, yet highly effective and rugged boat dolly capable of rapidly loading and off-loading boats and shifting such boats from either an off-shore floating or a beached location to a point of semi-permanent or permanent storage; yet, wherein once the boat is seated on the storage blocks at the storage facility, the dolly can be quickly removed without the need for any boat handling equipment required to lift the boat off the dolly and support the boat while the dolly is being removed from underneath the boat. The use of flexible weighted transverse straps which extend about the lift pads not only serves to prevent spreading of the dolly frame members during transport, but, additionally, serves to prevent damage to fully or partially extended lift pads which are supporting the boat's weight. While particularly suitable for use in transporting boats to storage facilities on a high speed basis at the end of the fishing season, those skilled in the art will appreciate that ofttimes during a fishing season it will be necessary for a fishing boat to be hauled out of the water for purposes of maintenance and/or repair requiring blocking of the boat. In such an instance, the present invention is highly advantageous in that a boat can be quickly hauled, transported, placed on blocks, repaired and returned to the water with a minimum amount of turn-around time being attributable to the dolly.

What is claimed is:

1. A straddle-type mobile boat dolly comprising, in combination:
   (a) a horizontal frame member comprising spaced parallel port and starboard main frames and a forward converging frame portion;
   (b) means for hitching said frame member to a towing mechanism;
   (c) running gear mounted on said frame member for supporting said dolly with freedom for over-land movement between points of dry storage and launching and/or hauling;
   (d) fore and aft pairs of port and starboard lift pad assemblies each including a piston/cylinder combination fixedly mounted on said frame member along the port and starboard sides thereof and a vertically extendable and retractable lift pad pivotally secured thereto for engagement with the hull of a boat and for support of the boat during transport;
   (e) actuating means mounted on said dolly and coupled to each of said piston and cylinder combinations for extending and retracting said lift pads;
   (f) means defining fore and aft take-up/pay-out reels mounted on said frame member outboard of one of the port or starboard lift pad assemblies for each pair of fore and aft port and starboard lift pad assemblies;
   (g) fore and aft first attachment means fixedly mounted on said frame member outboard of the other of said port and starboard lift pad assemblies for each pair of fore and aft port and starboard lift pair assemblies; and,
   (h) fore and aft flexible strap defining means each fixedly secured at one end to respective ones of said fore and aft reels, said fore and aft flexible strap defining means extending about the point of pivotal connection of said lift pads to said piston and cylinder combinations associated with each of said fore and aft port and starboard lift pad assemblies and spanning the space between said spaced parallel port and starboard main frames, said strap defining means having second attachment means secured to their free ends for releasable attachment to said first attachment means during support of a boat on said dolly with said fore and aft strap defining means extending beneath the keel of the boat and serving as tensioning means to prevent spreading of said port and starboard frame members and outward bending and/or spreading of said port and starboard fore and aft lift pad assemblies.

2. A straddle-type mobile boat dolly as set forth in claim 1 wherein said flexible strap defining means are weighted so as to insure submersion thereof when said dolly is backed into the water prior to and during on-loading of a floating boat.

3. A straddle-type mobile boat dolly as set forth in claims 1 or 2 wherein said lift pad assemblies each include a vertically oriented tubular guide member fixedly secured to said frame member, said piston/cylinder combination being mounted within said guide member with said cylinder fixed thereto and said piston being free for vertical reciprocation therein, said piston having a pivot roller mounted at its upper end normal thereto, said lift pad being pivotally mounted on said pivot roller, and said strap defining means extending over said pivot roller.

4. A straddle-type mobile boat dolly as set forth in claim 3 wherein said lift pad assemblies each include a second roller mounted on said lift pad and disposed slightly inboard of and parallel to said pivot roller, and said strap defining means extends over said pivot roller and said second roller for maintaining said pivotally mounted lift pad inclined inwardly and downwardly so as to conform generally to the curvature of the hull of a boat carried thereon.

5. A straddle-type mobile boat dolly as set forth in claim 3 wherein said piston/cylinder combinations are fluid actuated.

6. A straddle-type mobile boat dolly as set forth in claim 3 wherein said take-up/pay-out reels are provided with releasable latching means so that said strap defining means can be latched in position while extending beneath the hull of a boat carried on said dolly and in snug conformity thereto for preventing outward bending of said lift pad assemblies and/or spreading of said frame member.

7. A straddle-type mobile boat dolly as set forth in claim 1 further including vertically upstanding beam-like outrigger defining means removably secured to said frame member with freedom for selective mounting on said frame member adjacent either the port or starboard side of said dolly, said outrigger defining means being adjustable inwardly towards and outwardly away from the longitudinal fore/aft centerline of said dolly to a selected one of a plurality of fixed positions approximately equal to one-half the beam width of the boat to be loaded on said dolly.

8. A straddle-type mobile boat dolly as set forth in claim 7 wherein said frame member is provided with port and starboard laterally projecting integral beam-like stub tubes adjacent the aft end thereof, and said outrigger defining means includes a horizontally extending extension beam adapted to be telescopically mounted on one of said stub tubes and releasably secured thereto.

9. A straddle-type mobile boat dolly as set forth in claim 7 wherein said frame member is provided with port and starboard fore and aft laterally projecting integral beam-like stub tubes, and said outrigger defining means includes fore and aft vertically upstanding outriggers each including a horizontally extending extension beam adapted to be telescopically mounted on respective ones of the fore and aft stub tubes on either the port or starboard side of said dolly and releasably secured thereto.

10. A straddle-type mobile boat dolly as set forth in claims 8 or 9 wherein said outrigger defining means includes an open-ended tubular mounting bracket slidably mounted on said extension beam and means for releasably locking said bracket to said extension beam in a selected one of a plurality of positions spaced from the fore and aft longitudinal centerline of said dolly by a distance approximately equal to one-half the beam width of the boat to be loaded on said dolly.

11. A straddle-type mobile boat dolly as set forth in claims 1, 2 or 7 further including a third take-up/pay-out reel mounted on said frame member adjacent the aft end thereof, and third flexible strap defining means fixedly secured at one end to said third reel and adapted to extend about the stern of a boat mounted on said dolly, said third flexible strap defining means having second attachment means secured to its free end for releasable attachment to the aft one of said first attachment means for securing a boat mounted on said dolly from fore/aft movement relative thereto.

12. A straddle-type mobile boat dolly as set forth in claims 1, 2 or 7 further including a bow support member mounted on said frame member with freedom for fore and aft movement to one of a plurality of selected fixed positions, and means for locking said bow support member in said selected fixed position, said bow support member having a pivotally mounted bow engaging support 13. A straddle-type mobile boat dolly comprising, in combination:
   (a) a horizontal frame member comprising spaced parallel port and starboard main frames and a forward converging frame portion;
   (b) means for hitching said frame member to a towing mechanism;
   (c) running gear mounted on said frame member for supporting said dolly with freedom for over-land movement between points of dry storage and launching and/or hauling;
   (d) fore and aft pairs of port and starboard lift pad assemblies each including a piston/cylinder combination fixedly mounted on said frame member along the port and starboard sides thereof and a vertically extendable and retractable lift pad pivotally secured thereto for engagement with the hull of a boat and for support of the boat during transport;
   (e) actuating means mounted on said dolly and coupled to each of said piston and cylinder combinations for extending and retracting said lift pads;
   (f) flexible strap defining means fixedly secured at one end to one of said port and starboard main frames;
   (g) means for releasably securing the free end of said flexible strap defining means to the other of said port and starboard main frames with said flexible strap defining means spanning the space between said port and starboard main frames and extending beneath the keel of a boat supported on said dolly for preventing spreading of said port and starboard main frames during loading and/or transport of a boat on said dolly;
   (h) means for adjusting the effective length of said flexible strap defining means to accommodate boats having differing beam widths and/or hull configurations; and,
   (i) vertically upstanding beam-like outrigger defining means removably secured to said frame member with freedom for selective mounting on said frame member adjacent either the port or starboard side of said dolly, said outrigger defining means being adjustable inwardly towards and outwardly away from the longitudinal fore/aft centerline of said dolly to a selected one of a plurality of fixed positions approximately equal to one-half the beam width of the boat to be loaded on said dolly.

14. A straddle-type mobile boat dolly as set forth in claim 13 wherein said frame member is provided with port and starboard laterally projecting integral beam-like stub tubes adjacent the aft end thereof, and said outrigger defining means includes a horizontally extending extension beam adapted to be telescopically mounted on one of said stub tubes and releasably secured thereto.

15. A straddle-type mobile boat dolly as set forth in claim 13 wherein said frame member is provided with port and starboard fore and aft laterally projecting integral beam-like stub tubes, and said outrigger defining means includes fore and aft vertically upstanding outriggers each including a horizontally extending extension beam adapted to be telescopically mounted on respective ones of the fore and aft stub tubes on either the port or starboard side of said dolly and releasably secured thereto.

16. A straddle-type mobile boat dolly as set forth in claims 14 or 15 wherein said outrigger defining means includes an open-ended tubular mounting bracket slidably mounted on said extension beam and means for releasably locking said bracket to said extension beam in a selected one of a plurality of positions spaced from the fore and aft longitudinal centerline of said dolly by a distance approximately equal to one-half the beam width of the boat to be loaded on said dolly.

17. A flexible adjustable tensioning system for use with a load supporting system of the type having a pair of spaced support frame members each including a vertically adjustable load supporting lift pad assembly including: (i) a vertical tube-like guide member integral with respective ones of said spaced support frame members; (ii) a piston/cylinder combination having its cylinder mounted in said guide member; (iii) a pivot roller mounted on the free end of said piston and normal thereto; and (iv), a cushioned lift pad pivotally connected to said pivot roller, said tensioning system including a flexible web-like strap formed of synthetic material extending over said pivot rollers associated with each of said lift pad assemblies, a take-up/pay-out reel mounted on one of said frame members outboard of said vertical guide member mounted thereon, said strap having one end secured to said reel for permitting take-up and/or pay-out of said strap, first attachment means fixedly secured to the other of said frame members outboard of said vertical guide member mounted thereon, and second attachment means secured to the other end of said strap for releasable interconnection with said first attachment means whereby said strap spans the space between said spaced support frame members in underlying relation to the load supported on said lift pad assemblies and in snug conformity to the load and serves to prevent spreading of said frame members relative to one another and outward bending of said lift pad assemblies as a result of the load mounted thereon and whereby when said pistons are retracted and said lift pads are lowered, said strap is loosened, thereby permitting ease of disconnection of said first and second attachment means.

18. A flexible adjustable tensioning system as set forth in claim 17 wherein each of said lift pad assemblies include a second roller mounted on said lift pad and disposed slightly inboard of and parallel to said pivot roller, and said strap extends over said pivot roller and said second roller for maintaining said pivotally mounted lift pad inclined inwardly and downwardly.

* * * * *